United States Patent Office 2,994,536
Patented Aug. 1, 1961

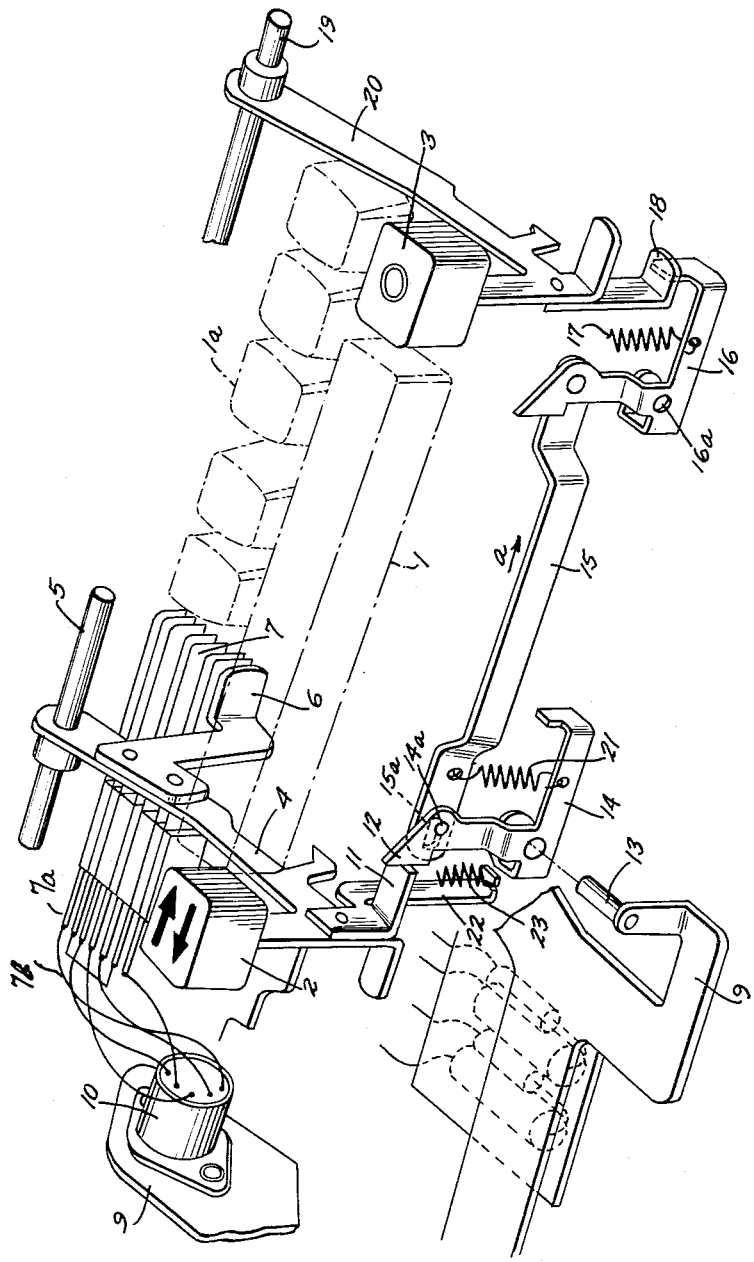

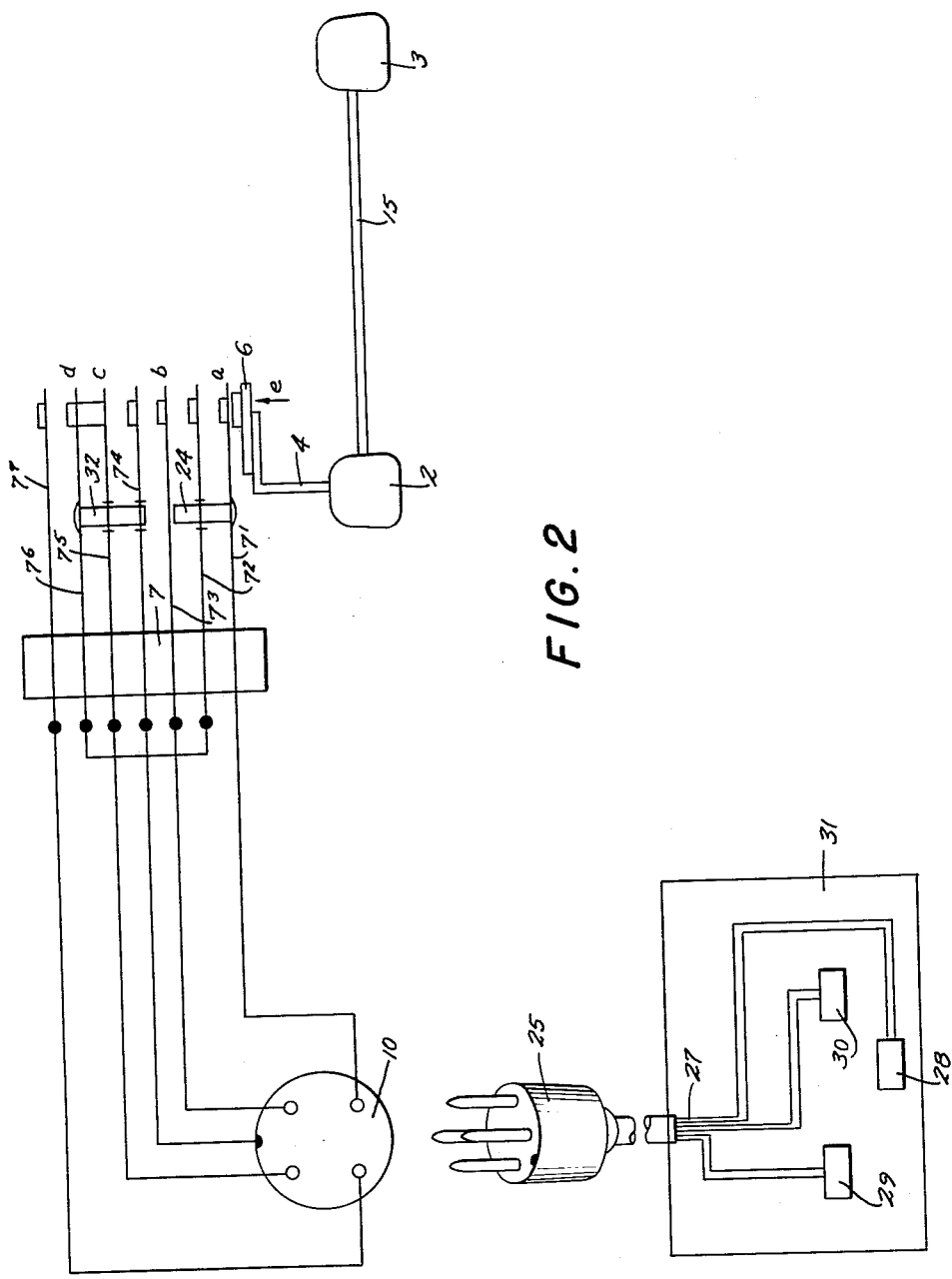

2,994,536
BUSINESS MACHINE WITH CONTROL DEVICE FOR SOUND-RECORDING APPARATUS
Friedrich Wunderlich, Nurnberg, Germany, assignor to Firma Triumph Werke Nurnberg A.G., Nurnberg, Germany
Filed Apr. 28, 1958, Ser. No. 731,542
Claims priority, application Germany Apr. 27, 1957
10 Claims. (Cl. 274—4)

The present invention relates to a business machine with control device for sound-recording apparatus, and more particularly to a typewriter which is provided in the region of its keyboard with control keys by which the operations of a sound-recording apparatus are controlled. Sound-recording apparatus, such as tape recorders requires at least three control operations which are frequently performed by the operator. First, the operator must start the machine so that the recorded sound is audibly reproduced, secondly, the operator has to stop the machine whenever the speed of dictation exceeds the transcribing speed, and thirdly the operator has to rewind the tape in opposite direction for a short distance to be able to listen a second time to a recorded dictation which the operator could not follow during the first reproduction.

It is known to provide three operating means associated with these functions in the region of the typewriter. However, the arrangements according to the known art are difficult to operate, since the operating keys are in a position in which rapid operation is difficult. It has also been proposed to shorten and displace the space bar of a regular typewriter keyboard to provide space for the three operating keys. This kind of control arrangement necessitates an unusual position of the space bar which detrimentally affects the normal operation of the typewriter.

It is one object of the present invention to overcome the disadvantages of known apparatus of the above described type and to provide a control device for sound-recording apparatus which is combined with a business machine in such a manner that it can be easily operated without disturbing the normal operation of the business machine.

Another object of the present invention is to provide a control device for sound-recording apparatus in which the main control functions are performed by only two control keys.

Another object of the present invention is to provide two control keys for the control of sound-recording apparatus in the region of the keyboard of the typewriter, preferably at the ends of a standard space bar.

Consequently, it is also an object of the present invention to provide control keys for sound-recording apparatus adjacent the normal keyboard of a typewriter in a position in which the operator can actuate the control keys without changing the typing position of her hands.

An important object of the present invention is the provision of a single control key which is movable from its normal position to two operative positions for effecting two different operations of a sound-recording apparatus.

A relater object of the present invention is the provision of a single control key which in one operative position thereof effects starting of the sound-recording apparatus, and in another operative position thereof effects return movement of the record carrier, such as rewinding of a magnetic tape for a predetermined length.

A further object of the present invention is to arrest such a control key in its position effecting reproduction of recorded sound, until a releasing control key is operated to release the first control key for return to its normal position resulting in stopping of the sound-recording apparatus.

With these objects in view the present invention mainly consists in a control device for controlling a machine which is adapted to reproduce sound recorded on a record carrier. The control device according to the present invention comprises control means connected to the recording machine and being movable between two positions for effecting two different operations of the recording machine; and at least one control key located in the region of the keyboard of the typewriter and being movable from its normal inoperative position into two different operative positions for actuating the control means to selectively effect the two different operations of the recording machine.

The present invention also consists in a control device in which a first control key effects start of the sound-recording machine when moved to an operative position, in which it is arrested until another control key releases the first key effecting stopping of the sound-recording machine.

In a preferred embodiment of the present invention, a first control key is provided at one end of the standard space bar, and a second control key is provided at the other end of the space bar. The first control key is movable from its normal inoperative position to two different operative positions for effecting start of the sound-recording machine, or rewinding of the record carrying tape. Arresting means arrest the first control key in its operative position which is associated with the normal playback of the recording machine, and are released upon operation of the second control key so that the first control key returns to its normal inoperative position in which the recording machine is stopped.

Other features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings in which: FIG. 1, is an isometric view of a control device according to the present invention; and FIG. 2 is a diagram illustrating the electric circuit of the apparatus.

Referring now to the drawing in which known parts of the typewriter, or similar business machine, are omitted for the sake of clarity, a space bar 1 is located in its usual position forwardly of the lowermost row of keys 1a of a keyboard by which the type levers of the typewriter are actuated. A first control key 2, and a second control key 3 are arranged at opposite ends of the space bar 1.

Control key 2 is mounted on a key lever 4 which is turnably mounted on a shaft 5 which is part of the machine frame, of which also a portion 9 is shown.

The second control key 3 is mounted on a key lever 20 which is turnable about a shaft 19 which is also part of the machine frame.

Control key 2 is marked with two arrows pointing in opposite directions, and indicating movement of the record carrying tape in opposite directions, as will be explained hereinafter in greater detail.

Control key 3 carries a marking intended to indicate stopping of the sound-recording machine.

An operating member 6 is fixedly secured to key lever 4 and moves with the same when control key 2 is depressed. Operating member 6 cooperates with a plurality of contact springs 7 which are arranged in a row. It is evident that depression of control key 2 will effect through operating member 6 bending of the contact springs 7. When control key 2 is depressed to a first operative position, only the contact springs 7 directly adjacent the operating member 6 are bent into a position in which contact is made between associated contact springs. The contact springs 7 include pairs of cooperating contacts which are separated by insulating members, shown in FIG. 2. When control key 2 is further depressed to a second operative position, the rearwardly located contact springs are also operated through the insulating members located between the same and the more forwardly located contact springs so that also the rearwardly located contacts engage each other.

The contacts 7 are each provided with terminals $7a$ to which are soldered conductors $7b$ whose other ends are connected to the terminals in a socket 10 which is mounted on the frame 9 of the machine. A plug 25, is plugged into the socket 10, and is connected to the sound-recording apparatus. The arrangement is such that when the foremost contacts 7 are closed, the sound-recording machine is started, preferably for playing back recorded sound. When also the rearwardly located contacts 7 are closed, the rewinding means of the tape recording apparatus are actuated to rewind the tape so that a portion of the tape may be played back a second time. The contact set 7 includes contact springs $7^1$–$7^7$, and pins 24 and 32 which pass through corresponding openings in springs $7^2$, $7^4$ and $7^5$ so that springs $7^1$ and $7^6$ can move without displacing the perforated contacts. When plug 25 is inserted into the socket 10, the main switch 28, the play-back relays 29, and the winding-back relays 30 of the sound recording machine 31 are connected to the associated contacts 7.

An angular member 11 is fixedly secured to key lever 4 and has a projecting portion engaged by the arresting portion 12 of an arresting member 14 which is pivotally mounted on a pin 13 on the frame 9 of the business machine. A link member 15 is articulated to arresting lever 14, and to another lever 16 which is also pivotally mounted on the frame of the machine by means of a pin, not shown, projecting into the bore $16a$. A spring 21 connects arresting lever 14 with link member 15, and another spring 17 is connected to lever 16 and also secured to the frame of the machine. Springs 21 and 17 tend to turn the respective associated levers 14 and 16 in counterclockwise direction as viewed in the drawing. An angular member 18 is secured to key lever 20, and is engaged by a portion of lever 16 under the action of spring 17. Consequently, spring 17 tends to return control key 3 to its normal inoperative position, and is tensioned when control key 3 is depressed. A portion 22 of member 11 is connected to one end of a spring 23 whose other end is secured to the frame of the machine, so that the control key 2 is urged to return to its normal inoperative position.

The control device operates as follows:

All elements are normally in the illustrated inoperative position, and tend to return to such position after actuation. Portion 12 of arresting member 14 abuts against portion 11 of the operating means 2, 4, 6 so that lever 14 cannot turn under the action of spring 21.

When control key 2 is depressed into its first operative position, portion 11 moves below the edge of catch portion 12, which snaps over portion 11 under the action of spring 21. A pin $14a$ is fixedly secured to arresting member 14 and projects into a slot $15a$ of link member 15, so that movement of arresting member 14 to arresting position is possible without displacement of link member 15 and lever 16.

When key 2 is in this first operative position, operating member 6 is displaced to such an extent that only the foremost contacts 7 of the control switch for the sound-recording machine are bent into circuit closing position. These contacts are associated with, and electrically connected to control apparatus in the sound-recording machine by which start of the sound-recording machine is effected. Contact $7^1$ is pressed against contact $7^2$, and pin 24 presses contact $7^3$ against contact $7^4$.

Thus, the contacts are closed at the points $a$, $b$ and $c$ in the first operative position of key 2. Consequently, the sound-recording machine is started in the first operative position of control key 2, and the tape is wound and moved in play-back direction, which is of course also recording direction. The operator may now listen to the playback of the recorded dictation and during this time operate the typewriter keys $1a$ and the space bar 1 without any interference with the control keys 2 and 3, while control key 2 is arrested by the arresting means 12, 14, 21. If the operator desires to stop the movement of the record carrier, the second control key 3 is depressed so that lever 16 turns in clockwise direction, and retracts link member 4 which turns arresting lever in clockwise direction so that portion 11 of control key 2 is released. Spring 23 immediately returns control key 2 to its normal inoperative position, so that operating member 6 releases contacts 7 which resiliently return to their normal position interrupting the circuit of the sound-recording machine so that the same stops. Consequently, control key 3 serves as a stop key. When control key 3 is again released, all elements return to the position illustrated in the drawing.

Assuming now that the stop key 3 has not been depressed, and that operating key 2 is in its first operative position arrested by arresting means 12, 14, then a situation may occur in which the operator desires to repeat the playback of a certain portion of the recorded dictation. In this event, the operator depresses control key 2 further into its second operative position which is possible since the arresting portion 12 only locks control key 2 against movement back to its normal inoperative position.

Control key 2 will remain in its second operative position only as long as it is depressed and will return to its first operative position when released by the operator. Control key 2 will again be arrested in its first operative position by arresting member 12 when released by the operator.

In the second operative position of control key 2, key lever 4 is turned a greater angle about shaft 5, and operating member 6 is displaced a greater distance than in the first operative position of control key 2. Consequently, the rearwardly located contacts 7 will be bent, since the displacement of the forwardly located contacts 7 is transmitted by insulating pieces to the rearwardly located contacts 7. The rearwardly located contacts 7 are electrically connected to elements of the sound-recording machine which effect rewinding of the tape. Preferably, the rearwardly located contacts 7 also control the circuits of elements which limit the rewinding operation to a predetermined length of tape. Thus, the operator is capable of rewinding the tape to a desired extent by depressing control key 2 to its second operative position. When control key 2 is released, it will return to its first operative position determined by arresting member 14 in which the tape is again moved in playback direction so that the operator may listen a second time to the dictation recorded on the rewound part of the tape. As shown in FIG. 2, the points $a$ and $b$ remain closed in the second operative position of key 2, while pin 24 presses against pin 32 of contact $7^6$ so that contacts $7^5$ and $7^6$ separate at point $c$, while contacts $7^6$ and $7^7$ close at point $d$.

As explained above, the operation may be stopped at any time by depressing control key 3 which effects return of all elements to inoperative position in which the recording machine is stopped, since all contacts 7 resiliently return to a circuit-breaking position.

From the preceding description of a preferred embodiment of the present invention, it will become apparent that the switch means including the contacts 7 constitute a control means for the sound-recording machine which is movable between a normal inoperative position, and two actuated positions in which a different number of contacts are closed. Elements 2, 11, 4, and 6 constitute operating means by which the control means are actuated, and elements 3, 20, 18, 17, 16, and 15 constitute means for releasing the arresting means 14, 21, 12 which tend to arrest the operating means in its first operative position.

It is also contemplated to construct the control key 2 as a pivoted key which is mounted on the frame of the machine movable between two angularly turned positions corresponding to the two above described operative positions. In addition thereto, control key 3 may be constructed to be movable to a second operative position in which further control operations are effected in the sound-recording machine by contact means closed by key 3 in its second operative position. It will be appreciated that the control device according to the present invention may be used with any typewriter, or business machine, regardless of whether the keys 1a and the space bar control electrical means for operating the associated elements of the machine, or mechanically act on such elements.

It will be understood that each of the elements described above, or two or more together, may also find a useful application in other types of control devices for sound-recording machines differing from the types described above.

While the invention has been illustrated and described as embodied in a control device including two control keys provided adjacent the space bar in the keyboard of the typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a typewriter having a frame, in combination, a control means for controlling a machine adapted to reproduce sound recorded on a record carrier, fixedly secured to said frame and being movable between a normal position effecting stopping of the machine, a first actuated position for effecting start of the machine, and a second actuated position for effecting a return movement of the record carrier; a keyboard mounted on the frame and including keys for actuating type levers and a control key movable between a normal position, a first operative position, and a second operative position, said control key being operatively connected to said control means and moving the same to said first actuated position when said control key is moved to said first operative position, and moving the same to said second actuated position when said control key is moved to said second operative position, said control means returning to said normal position for stopping said machine when said control key returns to said normal position; arresting means for arresting said control key in said first operative position to prevent return of said control key to said normal position, but permitting movement to said second operative position, said arresting means being releasable whereby said control key and said control means return to said normal positions thereof and the machine is stopped.

2. In typewriter having a frame, in combination, a control means for controlling a machine adapted to reproduce sound recorded on a record carrier, comprising control switch means for said machine and including a plurality of contacts fixedly secured to said frame and being movable between a normal position effecting stopping of the machine, a first actuated position for effecting start of the machine, and a second actuated position for effecting a return movement of the record carrier; a socket means fixedly secured to said frame and having a plurality of terminals adapted to engage the prongs of a plug connected to said machine; a plurality of conductors respectively connecting said terminals with said contacts; a keyboard mounted on the frame and including keys for actuating type levers and a first control key movable between a normal position, a first operative position, and a second operative position, said control key being operatively connected to said control switch means and moving said contacts to said first actuated position when said first control key is moved to said first operative position, and moving the same to said second actuated position when said first control key is moved to said second operative position; said control means returning to said normal position for stopping said machine when said control key returns to said normal position, arresting means for arresting said control key in said first operative position to prevent return of said first control key to said normal position, but permitting movement to said second operative position; and releasing means mounted on said frame and including a second control key adjacent said keyboard and being movable between a normal inoperative position and a releasing position, said releasing means being connected to said arresting means for releasing the same, when said second control key is moved to said releasing position thereof whereby said first control key and said control means return to said normal positions thereof and the machine is stopped.

3. In typewriter having a frame, in combination, a control means for controlling a machine adapted to reproduce sound recorded on a record carrier; being mounted fixedly secured to said frame and being movable between a normal position effecting stopping of the machine, a first actuated position for effecting start of the machine, and a second actuated position for effecting a return movement of the record carrier; a keyboard mounted on said frame and including a space bar, a first control key located on one side of said space bar and being movable between a normal position, a first operative position, and a second operative position, said first control key being operatively connected to said control means and moving the same to said first actuated position when said first control key is moved to said first operative position, and moving the same to said second actuated position when said first control key is moved to said second operative position; arresting means for arresting said first control key in said first operative position to prevent return of said first control key to said normal position, but permitting movement to said second operative position; and releasing means mounted on said frame and including a second control key on the other side of said space bar and being movable between a normal position and a releasing position, said releasing means being connected to said arresting means for releasing the same when said second control key is moved to said releasing position thereof whereby said first control key and said control means return to said normal positions thereof and the machine is stopped.

4. In typewriter having a frame, in combination, a control means combination for controlling a machine adapted to reproduce sound recorded on a record carrier, fixedly secured to said frame and being movable between a normal position effecting stopping of the machine and an actuated position for effecting start of the machine; a keyboard mounted on said frame and including a space bar, a first control key located adjacent said space bar and being movable between a normal position and at least one operative position, said first control key being operatively connected to said control means and moving the same to said actuated position when said first control key is moved to said operative position; arresting means for arresting said operating means in said operative position; and releasing means fixedly secured to said frame and including a second control key adjacent said space bar and being movable between a normal position and a releasing position, said releasing means being connected to said arresting means for releasing the same when said second control key is moved to said releasing position thereof whereby said first control key and said control means return to said normal positions thereof and the machine is stopped.

5. A control device as set forth in claim 4 wherein said space bar is an elongated member, and wherein said first control key is located at one end of said space bar and said second control key is located at the other end of said space bar.

6. In typewriter having a frame, in combination, a control means for controlling a machine adapted to reproduce sound recorded on a record carrier, comprising control switch means for said machine and including a plurality of contacts fixedly secured to said frame and being movable between a normal position effecting stopping of the machine, a first actuated position for effecting start of the machine, and a second actuated position for effecting a return movement of the record carrier; a keyboard mounted on said frame and including a space bar on a first control key located at one end of said space bar and being movable between a normal position, a first operative position, and a second operative position, said first control key being operatively connected to said control switch means and moving said contacts to said first actuated position when said first control key is moved to said first operative position, and moving the same to said second actuated position when said first control key is moved to said second operative position; arresting means including a catch member pivotally mounted on said frame, and a spring connected to said catch member and urging the same to turn in one direction, said catch member abutting on a portion of said first control key in said normal position of the same and moving to an arresting position projecting over said portion and arresting said first control key when the same is moved to said first operative position to prevent movement of said first control key to said normal position, but permitting movement of said first control key to said second operative position; and releasing means fixedly secured to said frame and including a second control key located at the other end of said space bar and being movable between a normal inoperative position and a releasing position, said releasing means including a member connected to said catch member for moving the same in opposite direction out of said arresting position when said second control key is moved to said releasing position thereof whereby said first control key and said control means return to said normal positions thereof and the machine is stopped.

7. In a typewriter, in combination, a frame; a keyboard including keys for actuating type levers, and a control key movable between a normal inoperative position, a first operative position, and a second operative position; and control means for a sound-reproducing machine fixedly secured to said frame movable between a normal position for stopping the machine and two actuated positions for effecting two different operations of the machine, said control means being operatively connected and actuated by said control key so that said control means moves to said two actuated positions thereof when said control key is moved to said operative positions thereof.

8. In a typewriter, in combination, a frame; a keyboard including keys for actuating type levers, a first control key movable between a normal inoperative position, a first operative position, and a second operative position and a second control key; biasing means urging said first control key into said normal position; arresting means mounted on said frame for arresting said first control key in said first operative position to prevent movement of said first control key to said normal position, while permitting movement to said second operative position; said second control key being operatively connected to said arresting means for releasing the same; and control means for a sound-reproducing machine fixedly secured to said frame movable between a normal position for stopping the machine and two actuated positions for effecting two different operations of the machine, said control means being operatively connected and actuated by said first control key so that said control means moves to said two actuated positions thereof when said first control key is moved to said operative positions thereof.

9. A typewriter as set forth in claim 8, wherein said keyboard includes an elongated space bar, said control keys being located at the opposite ends of said space bar.

10. In a typewriter, in combination, a frame; a keyboard including keys for actuating type levers, a first control key movable between a normal inoperative position and at least one operative position, and a second control key; biasing means urging said first control key into said normal position; arresting means mounted on said frame for arresting said first control key in said operative position to prevent movement of said first control key to said normal position; said second control key being operatively connected to said arresting means for releasing the same; and control means for a sound-reproducing machine fixedly secured to said frame movable between a normal position for stopping the machine and at least one actuated position for effecting an operation of the machine, said control means being operatively connected and actuated by said first control key so that said control means moves to said actuated position thereof when said first control key is moved to said operative position thereof.

References Cited in the file of this patent

UNITED STATES PATENTS

| | | |
|---|---|---|
| 780,860 | Brusseau | Jan. 24, 1905 |
| 1,733,951 | Durand | Oct. 29, 1929 |
| 1,983,039 | Lucarelle et al. | Dec. 4, 1934 |
| 2,488,482 | Swarthout et al. | Nov. 15, 1949 |
| 2,698,882 | Payne et al. | Jan. 4, 1955 |

FOREIGN PATENTS

| | | |
|---|---|---|
| 868,370 | France | Dec. 29, 1941 |